United States Patent Office.

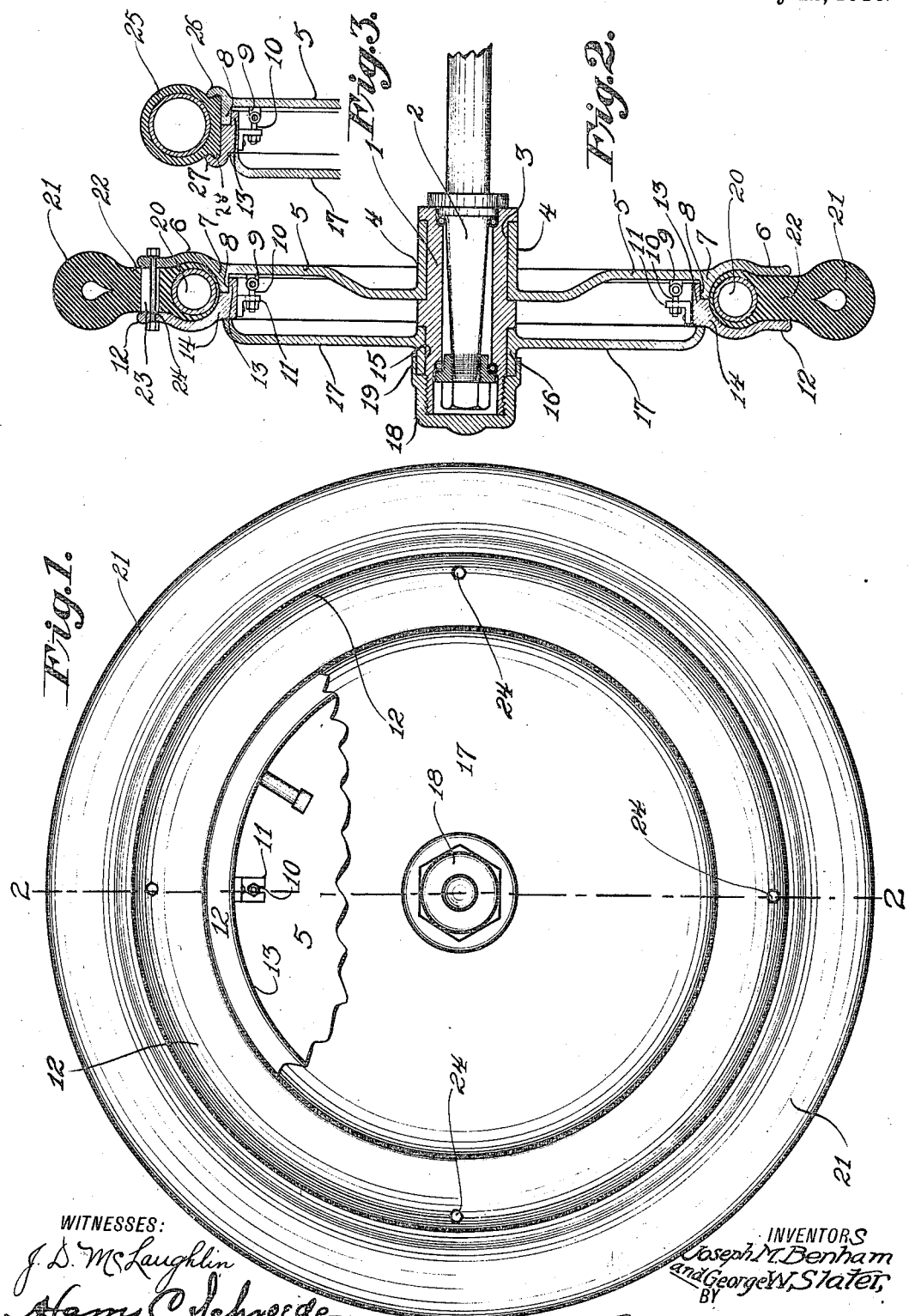

JOSEPH M. BENHAM AND GEORGE W. SLATER, OF OAKLAND, CALIFORNIA.

VEHICLE-WHEEL.

964,462.

Specification of Letters Patent.  Patented July 12, 1910.

Application filed June 19, 1909. Serial No. 503,158.

*To all whom it may concern:*

Be it known that we, JOSEPH M. BENHAM and GEORGE W. SLATER, citizens of the United States, residing at Oakland, in the county of Alameda and State of California, have invented certain new and useful Improvements in Vehicle-Wheels, of which the following is a specification, reference being had therein to the accompanying drawing.

This invention relates to wheels, and has principally in view a wheel adapted for use on motor vehicles in which novel means are employed for retaining a resilient tire thereon.

In carrying out the object of the invention generally stated above it is contemplated forming the improved wheel of a hub and a pair of plates, one of the plates being provided with a rigid clamping jaw, the other plate serving to retain a detachable clamping jaw in opposed relation to the rigid jaw so that a resilient tire may be detachably retained between said jaws.

In the practical application of the invention it will be understood that the essential features thereof are necessarily susceptible of changes in details and structural arrangements, but a preferred and simple embodiment of the same is shown in the accompanying drawings, wherein—

Figure 1 is a view in side elevation of the improved wheel, part of the same being broken away. Fig. 2 is a central vertical sectional view thereof taken on the line 2—2, Fig. 1. Fig. 3 is a fragmentary sectional view showing the improved wheel adapted for use in connection with the common type of resilient tire.

Referring to said drawings by numerals 1 designates the hub of the improved wheel which is shown mounted upon an axle 2. Said hub is provided adjacent its inner end with a circumferential widened groove forming a seat 3 for a sleeve 4 which carries a disk shaped plate 5 the periphery of which is in the form of a resilient jaw 6 having a concaved seat 7 formed on its inner plate the bottom of which projects at substantially right angles to said plate to provide a base flange 8. Pivot ears 9 project beneath said flange 8, said ears being arranged at regular intervals and having pivotally mounted therein a pivot bolt 10 which is normally held in engagement with lugs 11 depending from the bottom of a movable gripping jaw 12, said bottom having an outwardly projecting laterally arranged flange 13 which engages under the base flange 8, so that said two jaws are held in overlapping and abutting relation, as is shown in Figs. 2 and 3. Said jaw 12 is provided with a concaved seat 14 complemental to the seat 7 of the jaw 6.

The outer end portion of the hub 1 is provided with an annular groove 15 forming a seat for a sleeve 16 which carries a concaved housing plate 17 the outer edge of which contacts with the outer surface of the jaw 12 so as to hold the same in a tire engaging position. Said plate 17 is retained on the hub by means of a cap 18 having a threaded engagement with said hub and also provided with an end flange 19 which engages over the sleeve 16.

The construction of wheel described in the foregoing is especially adapted for use in connection with a tire of the type shown in Fig. 2, said tire having an inner inflatable portion 20, an outer cushioned tread surface 21 and a connecting narrow portion 22, said connecting portion being provided with regularly spaced apart transversely extending slots 23 through which bolts 24 pass and which are fastened to the outer ends of the jaws 6 and 12.

In Fig. 3 of the accompanying drawings the improved wheel has been shown adapted for use in connection with the common type of tire 25, the clamping jaws 26—27, being short and engaging with the flanged base 28 of said tire in a manner similar to the well known clencher rim. In all other respects the wheel shown in Fig. 3 is the same as that shown in the other figures of the drawings.

It will be seen from the foregoing that in both forms of the invention a tire may be readily removed from the wheel without the use of a tool other than a wrench.

The tire shown in Fig. 3 is not claimed in this application as the same forms the subject-matter of an application filed June 19, 1909; Serial No. 503,157.

What I claim as my invention is:—

A wheel comprising a hub, a disk-shaped plate mounted on the hub and having its periphery provided with a rigid jaw, and a laterally projecting flange in the inner edge of said jaw forming a part of the tire seat, projections mounted at regular intervals on the inner surface of the disk-shaped plate, bolts hinged to said projections, a detachable jaw having at its inner edge a shouldered flange overlapping the flange on the fixed jaw and coöperating therewith to form a tire seat, slotted lugs projecting at intervals in a radial direction from the inner face of said detachable jaw and adapted to be engaged by said hinged bolts, nuts on said bolts for locking the same in engagement with said lugs, a concave housing plate mounted on the wheel hub and bearing at its periphery against said detachable jaw to hold the same in place, and a nut for securing said concave plate on said hub.

In testimony whereof we hereunto affix our signatures in presence of two witnesses.

JOSEPH M. BENHAM.
GEORGE W. SLATER.

Witnesses:
H. C. SCHROEDER,
F. P. SCHROEDER.